United States Patent
Charlier et al.

(10) Patent No.: US 7,848,908 B2
(45) Date of Patent: Dec. 7, 2010

(54) METHOD FOR OPTIMIZING ACOUSTIC COMFORT IN A MOBILE VEHICLE PASSENGER COMPARTMENT

(75) Inventors: Julien Charlier, Chateau-Thierry (FR); Marc Rehfeld, Ezanville (FR)

(73) Assignee: Saint-Gobain Glass France, Courbevoie (FR)

( * ) Notice: Subject to any disclaimer, the term of this patent is extended or adjusted under 35 U.S.C. 154(b) by 403 days.

(21) Appl. No.: 12/066,180

(22) PCT Filed: Sep. 20, 2006

(86) PCT No.: PCT/FR2006/050910

§ 371 (c)(1), (2), (4) Date: Mar. 7, 2008

(87) PCT Pub. No.: WO2007/034113

PCT Pub. Date: Mar. 29, 2007

(65) Prior Publication Data

US 2008/0245609 A1    Oct. 9, 2008

(30) Foreign Application Priority Data

Sep. 20, 2005    (FR)    .................................... 05 52814

(51) Int. Cl.
*G06F 17/50*    (2006.01)

(52) U.S. Cl. ............... 703/2; 703/5; 181/207; 181/286; 600/27

(58) Field of Classification Search ............ 703/1, 703/7, 2, 5; 181/284, 207, 286; 600/301, 600/27

See application file for complete search history.

(56) References Cited

U.S. PATENT DOCUMENTS

| 5,504,282 | A | 4/1996 | Pizzirusso et al. |
| 6,616,789 | B2 * | 9/2003 | Price et al. ................... 156/245 |
| 6,820,720 | B1 | 11/2004 | Nicolai et al. |
| 2005/0126848 | A1 | 6/2005 | Siavoshai et al. |
| 2007/0033077 | A1 * | 2/2007 | Grussing et al. ............... 705/7 |
| 2008/0071136 | A1 * | 3/2008 | Oohashi et al. ............... 600/27 |
| 2008/0167539 | A1 * | 7/2008 | Teller et al. .................. 600/301 |

FOREIGN PATENT DOCUMENTS

| EP | 0 908 866 | 4/1999 |
| FR | 2 256 658 | 7/1975 |
| JP | 2004 130731 | 4/2004 |
| WO | 2004 012952 | 2/2004 |

* cited by examiner

*Primary Examiner*—Thai Phan
(74) *Attorney, Agent, or Firm*—Oblon, Spivak, McClelland, Maier & Neustadt, L.L.P.

(57) ABSTRACT

A method for optimizing sound and vibration comfort in a mobile passenger compartment, the method applied by a design team to carry out overall design of the passenger compartment and/or by at least one equipment supplier to carry out design of a portion of the passenger compartment. The method establishes target values to be achieved for well-identified comfort indices, defines requirements and input data relating to plural equipment suppliers to obtain a totality of information relating to the passenger compartment, estimates values of the comfort indices and compares them with the target values, and then modifies individually or in combination the input data to correlate them with the target values.

20 Claims, 1 Drawing Sheet

METHOD FOR OPTIMIZING ACOUSTIC COMFORT IN A MOBILE VEHICLE PASSENGER COMPARTMENT

Figure 1:
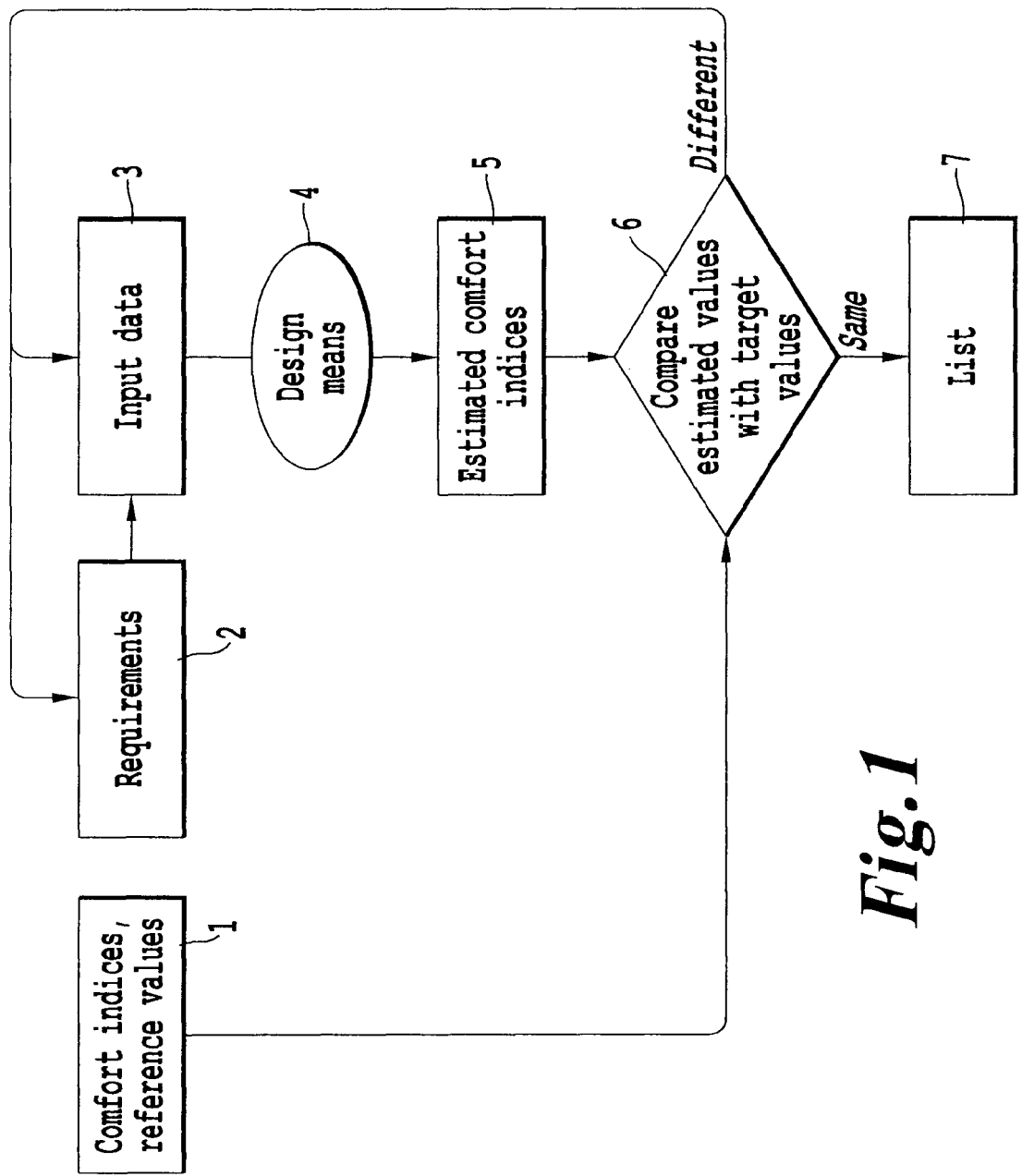

The invention relates to a method for reducing the sound and vibration nuisance in a passenger compartment, in particular a mobile passenger compartment such as a vehicle, particularly a motor vehicle.

In addition to motor vehicles or other types of vehicles such as trucks, coaches, agricultural equipment, the invention applies to all types of locomotion plant having an enclosed or substantially enclosed passenger compartment, such as aircraft, trains, boats, submarines, etc.

Amongst all the qualities contributing to comfort in modern means of transport such as trains and motor vehicles, sound and vibration comfort is becoming a determining factor. Specifically, the other sources of annoyance of mechanical, heat, visibility, etc. origin have been brought fairly well under control. But the enhancement of sound and vibration comfort presents new difficulties.

There are different types of disruptions to sound comfort in a vehicle:
  noises of aerodynamic origin, that is to say created by the friction of the air on the vehicle when it is moving,
  external noises transmitted through the air, generated for example when passing other vehicles, or such as engine noises (in particular when going through a tunnel or close to an object reflecting the sound waves such as a concrete wall), noises from the mouth of the exhaust pipe, road noises, or else rearview mirror noises (noises that have an aerodynamic origin but that are propagated through the air),
  impact noises, such as rain striking the vehicle,
  solidborne noises, that is to say noises transmitted through the bodyshell of the vehicle, having for example as their origin the vibrations of the engine (in particular at certain engine rotation speeds), of the exhaust system, of the shock absorbers, of the drive train, etc.

In the same manner, there are different types of disruptions of vibration comfort:
  the vibrations originating from the running gear that are transmitted to the bodyshell, for example generated by running on the pavement and transmitted to the bodyshell by the shock absorbers and,
  the vibrations originating from the drive train (engine, gearbox, exhaust system) and transmitted to the bodyshell.

In vehicle design, the assembler and the equipment suppliers are commonly distinguished.

The assembler provides the overall design, the assembly and marketing of the vehicles, either directly or by using partial or total subcontracting.

The equipment suppliers carry out the design and production of parts or items of equipment used in the construction of the vehicle, either directly or by using partial or total subcontracting.

In their design activity on the complete vehicle or on certain parts or items of equipment, the team made up of the assembler and one or more of its equipment suppliers is called the "design team".

Many efforts have been made by assemblers and certain equipment suppliers to enhance the sound and vibration comfort inside the passenger compartment of the vehicle, for example by using absorbent coatings inside the vehicle, or by providing elastomer connecting parts for the mechanical system of the vehicle, or else by providing technical enhancements to the glazing units, in particular:

the shapes of the glazing units have been modified; penetration in the air has been improved and turbulence has been reduced which itself is a source of noise.
  laminated glazing units are made whose interlayer has properties for improving vibration damping and sound insulation giving the passenger compartment good protection against the aerodynamic noises and/or the airborne noises and/or solidborne noises. The interlayers that can be cited are those having the features described in patent EP 387 148-B1 and in patent application EP 844 075.
  use is made of seals placed between the bodywork of the vehicle and the glazing, and consisting of one or more materials whose characteristics allow a damping of vibrations. Patent applications PCT/FR03/02417 and FR 04/09807 give details of the characteristics provided by such seals.
  radiation zones have been created in phase opposition to the radiation zones created by the excitation of the glazing unit subjected to a vibration field in order to reduce the overall radiation of the glazing unit.
  a proposal has been made to locally modify the glazing bodywork connection at the peripheral seal; for example, reducing the movement of the glazing unit in the peripheral seal only over a limited portion of the periphery of the glazing unit makes it possible to produce a glazing unit without at least the first odd radiation mode when the latter is excited by a sound field (patent application EP 908 866).

It has however been found that the various solutions proposed independently by each equipment supplier or by the assembler are not necessarily suitable for all vehicles. The inventors have shown that in particular the size of the vehicle, its passenger compartment, the type of materials used in its construction, also play a role in propagating the vibration fields and with respect to the more particular frequencies for which these vibration fields cause disruption to the sound or vibration comfort.

It is important to emphasize that the invention is not devoted only to reducing the sound and vibration level but is also devoted to enhancing the sound and vibration comfort that lies in particular in improving the noise or residual vibrations, preferring for example continuous noises to intermittent noises.

Also, the object of the invention is to provide a new approach in the design of solutions providing general comfort both in terms of sound and vibration, and suitable for each type of passenger compartment.

The invention therefore proposes to consider, in combination, the main parameters influencing the generation, propagation and transmission of the vibration and sound fields through and inside the passenger compartment, taking account of the type of vehicle, its shape, its constituent materials, and in particular the vibration-sound behavior of the glazing units that lies in particular in the shape of the glazing unit, in the structure of the glazing unit, in the glazing unit/passenger compartment interface.

The invention provides a method for optimizing the control of sound and vibration comfort inside a passenger compartment while complying with a specification supplied by the manufacturer, in terms of sound performance, vibration performance and cost of the means to be used to obtain comfort improvement performance, and ensuring in particular the feasibility of the elements, that the thicknesses of the glazing units are not unwisely increased for weight reasons, that the optical quality through the glazing units is not diminished, that the mechanical strength of the passenger compartment is not diminished, ensuring that the glazing unit can be wiped depending on its shape, etc.

The method of the invention is applied by the assembler intended to carry out the overall design of the passenger compartment and/or by an equipment supplier intended to carry out the design of a portion of the passenger compartment.

According to the invention, the method for optimizing the sound and vibration performance inside a mobile passenger compartment consists in:

establishing the list of comfort indices that are the criteria defining the quality of the sound and vibration performance and providing target values of these indices, establishing the list of requirements concerning some or all of the whole passenger compartment and relating to several equipment suppliers, the requirements being information relating to all the exigencies other than those concerning the sound or vibration comfort, defining input data influencing the generation, propagation and transmission of the vibration and sound fields inside the passenger compartment, the input data being associated with several equipment suppliers and certain input data being limited by requirements, estimating the values of the passenger compartment comfort indices according to the input data, comparing the estimated values with the target values, when the estimated values do not match the target values, acting individually or in combination on some or all of the input data, repeating in an iterative manner the steps for estimating the vehicle comfort index values, for comparing them with the target values, and for acting on the input data, so as to ensure the convergence of the values of the comfort indices with the target values.

"Convergence of the values" means obtaining the target values exactly or obtaining values substantially close to the target values according to a differential margin that has been fixed.

The quality of the sound and vibration performance corresponds to the comfort objectives decided upon by the assembler according to the type, the vehicle range, the target market, the image that he wishes to promote in terms of comfort, the specification supplied by the client, etc.

These objectives or criteria defining the quality of performance are reflected in the form of measurable physical indices relating to the interior of the mobile passenger compartment or associated with a part or an item of equipment of the passenger compartment.

As nonlimiting examples, the physical indices are the level of sound pressure at certain points of the passenger compartment, the level of vibration movement, speed or acceleration at certain points of the passenger compartment, the psychoacoustic or intelligibility index at certain points of the passenger compartment, the level of sound power radiated by a part or an item of equipment, the level of force injected by a part or an item of equipment, the coefficient of sound absorption of certain parts or items of equipment, the sound insulation of certain parts or items of equipment, the coefficient of vibration damping provided by certain parts or items of equipment, the vibration attenuation provided by a fastening system between two parts or items of equipment.

According to one feature, the user establishes the list of absolute requirements, that is to say the characteristics that must necessarily be satisfied to ensure certain functions that are considered essential, and upon which it is imperative not to act, and the list of undefined requirements, that is to say the characteristics whose values may change without prejudice to the overall quality of the mobile passenger compartment by defining the proportions or ranges for which these values can be varied.

According to another feature, the input data such as the geometry and/or the dimensions of the passenger compartment and constituent elements of the vehicle, the physical properties of the materials and the behavioral states of the constituent elements of the mobile passenger compartment with respect to the sound and vibration excitations are defined in the form of values, modal bases, transfer functions, spectra or interspectra, etc.

The input data may be frozen if they match absolute requirements, may vary in a certain context if they match undefined requirements or may remain free if they have no connection with the defined requirements.

Before beginning all the estimating, measuring or computing operations, it is preferable to define the design means that are used precisely to estimate magnitudes correlated with the target values of the criteria defining the quality of the sound and vibration performance, and to compare these magnitudes with the target values.

The design means may be based on experimental approaches, totally numerical predictive approaches, or on a combination of these approaches.

The predictive design means may make it possible in principle to estimate the value of the comfort indices that could be obtained on a mobile passenger compartment, a part or an item of equipment before producing it. They may also make it possible to apply a hierarchy to several possible solutions with respect to the comfort objectives that have been defined, indicating which solutions make it possible to come closest to the objectives.

The predictive means have the advantage of allowing an estimate of the indices before the passenger compartment or its subsystems are produced. The production of prototypes often being costly and slow, the application of predictive means may save time and reduce design costs. The predictive means however give an estimate of the indices with a precision that is difficult to quantify and is sometimes inadequate, which depends on the hypotheses made during modeling. The degree of reliability required for the design means may be adapted to how critical the studied phenomenon is in terms of comfort: for example, if the design team is working on an objective that is considered sensitive, it must equip itself with reliable means for envisaging the problem. The degree of reliability required for the design means may be adapted to the design stage: for example, means giving fairly rough, low-cost results may appear satisfactory at the pre-project stage for determining certain major guidelines in terms of sound or vibration comfort, while means requiring more resources are favored in the detailed design stage because of their better reliability.

The objectives are achieved by modifying the input data: while keeping unchanged the input data that are frozen by an absolute requirement, or by modifying the input data relating to undefined requirements, within the framework set for them, or by freely modifying the input data that are independent of any requirement.

The variations of input data may be chosen at the initiative of one person, often a specialist in the sound and vibrations field, depending on his experience, his understanding of the various phenomena, his use of the optimization means. The choice of the variations of input data may be partially or totally automated, based for example on an optimization algorithm.

In a nonexhaustive manner, it is possible to cite the following actions carried out on certain input data to modify the latter in order to participate in the optimization of comfort, particularly with respect to the glazing units associated with the passenger compartment:

- the shape of a radiation mode of the glazing unit, constituting an item of input data, when said glazing unit is excited by a sound or vibration field, is modified in a spatial manner. Therefore, it is possible to remove for the glazing unit at least the radiation mode or modes that are coupled with one or more cavity modes of the passenger compartment, for example by reducing at least the response of the first odd mode, for the glazing unit. This is done in particular by a locally reduced movement of the glazing unit in the associated peripheral seal between the glazing unit and the passenger compartment.
- a radiation mode of the glazing unit is offset frequentially relative to a cavity mode of the passenger compartment.
- sound phenomena are generated in phase opposition relative to the radiations in the passenger compartment, which is usually called active control.
- the air flow coming into contact with the glazing unit, such as by the association of deflectors on the outside of the passenger compartment, is modified.
- action is taken on the nature of the material of the associated peripheral seal between the glazing unit and the passenger compartment.
- the mechanical coupling between the glazing unit and the passenger compartment is modified so as to provide more help with dissipating the vibration energy, according to shearing work, or according to tension/compression work depending on the nature of the passenger compartment materials and of the intermediate elements between the glazing unit and the passenger compartment.
- the shape, thickness and/or constituent materials of the glazing unit are modified.

When, after a number of iterations for the steps for estimating the values of the indices, for comparison and for action on the input data, has been judged sufficient depending on the complexity of the problem posed, no input data set has made it possible to achieve the objectives, the latter are redefined by redefining in particular the input data and where necessary the requirements.

When the optimization method is finished, a list of input data having made it possible to achieve them is established.

The optimization method is preferably applied by the design team in order to converge on optimal solutions ensuring, for the passenger compartment:

- compliance with the requirements: strict compliance with the absolute requirements, compliance with the undefined requirements in the context of what has been set,
- achievement of the sound and vibration comfort objectives, either strictly, or as close as possible using a compromise approach. The compromise approach consists in redefining the objectives, up or down, in order to be able to obtain a satisfactory solution.

The optimization approach according to the invention ensures a necessary interaction between the requirements and the input data of the various equipment suppliers in order to consider all this information in its entirety.

Other features and advantages will appear in the rest of the description with respect to the schematic drawing of FIG. 1.

The method for optimizing the sound and vibration performance inside a mobile passenger compartment such as a vehicle, in this instance a motor vehicle, consists, according to the invention, in following the steps below:

- establishing the list of comfort indices that are the criteria defining the quality of the sound and vibration performance and providing target values of these indices (block 1 of FIG. 1),
- establishing the list of requirements (block 2), that correspond to information relating to all the exigencies other than those concerning sound or vibration comfort,
- defining input data influencing the generation, propagation and transmission of the vibration and sound fields inside the passenger compartment (block 3), certain input data being able to be linked to requirements (arrow from block 2 to block 3),
- estimating the values of the vehicle comfort indices according to the input data (block 5) thanks to the design means (block 4),
- comparing the estimated values with the target values (block 6),
- when the estimated values do not match the target values, acting individually or in combination on some or all of the input data,
- repeating in an iterative manner the steps for estimating the vehicle comfort index values, for comparing them with the target values, and for acting on the input data, so as to ensure the convergence of the values of the comfort indices with the target values.

First of all, this means establishes the list of criteria defining the quality of the sound and vibration performance (block 1). This quality corresponds to the comfort objectives decided upon by the assembler according to the type, the vehicle range, the target market, the image he wishes to promote in terms of comfort, the specification supplied by the client, etc.

The comfort objectives are reflected in the form of physical indices that are measurable with reference to the inside of the vehicle or measurable by being associated with a part or an item of equipment of the vehicle.

The physical indices that are measurable inside the vehicle characterize the vehicle in its entirety, for example:

- the level of sound pressure (linear or weighted) at certain points of the passenger compartment, for example at the ears of the driver, of the front passenger or of the rear passengers;
- the level of vibration movement, speed or acceleration (linear or weighted) at certain points of the passenger compartment, for example at the floor, the steering wheel, the gearshift lever or the base of the inside rear-view mirror;
- the psychoacoustic (such as loudness or roughness) or intelligibility (such as RASTI or STI) index at certain points of the passenger compartment. These indices are values obtained by a specific processing of sound pressure signals measured in the vehicle.

The comfort objectives may also be associated with a part or a particular item of equipment, for example:

- the level of sound power radiated by a part or an item of equipment. This can include the sound power radiated by the air vents inside the passenger compartment, the sound power radiated by the exhaust outside the passenger compartment, the sound power radiated by the engine outside the passenger compartment, the sound power radiated by the air flow around the outside rear-view mirrors, the sound power generated by contact between the wheels and the road;
- the level of force injected by a part or an item of equipment. This can include the force injected into the bodyshell by the drive train via the attachment parts (complete or by one or more of its subsystems, such as the engine, the gearbox, the exhaust system etc.), the forces injected into the bodyshell by the running gear (axle boxes, driveshaft, shock absorber, suspension, etc.);

the coefficient of sound absorption of certain parts or items of equipment. This can include the sound absorption provided by an internal coating of the passenger compartment, by a coating placed inside the engine hood;

the sound insulation of certain parts or items of equipment, for example the sound insulation of certain elements forming the bodywork, or the sound insulation by the glazing units attached to the bodywork;

the coefficient of vibration damping provided by certain parts or items of equipment. This can include the vibration damping provided at the bodyshell by a bituminous product bonded to the sheet metal, the vibration damping provided to the bodyshell and/or the glazing by an interlayer inserted between two sheets of glass, the vibration damping provided to one or more parts by a fastening adhesive;

the vibration attenuation provided by a fastening system between two parts or items of equipment, one of which constitutes a source of vibrations. This can include the vibration attenuation provided by flexible elements interposed between the engine block and the bodyshell, the vibration attenuation provided by the suspension systems interposed between the running gear and the bodyshell, the vibration attenuation provided by the flexible elements interposed between the exhaust system and the bodyshell.

In any case, the target value allocated to each of the comfort indices for judging sound and vibration comfort quality may be unique (for example a threshold that must not be exceeded irrespective of the configuration of use), or else may depend on various parameters, for example the frequency, the engine rotation speed, the engine load, the speed and the running conditions, the fact that various items of equipment are running or stopped, etc.

In the method of the invention, it is necessary to take account of the requirements (block 2) that are set by the assembler according to the design of the vehicle to satisfy all the exigencies other than those concerning sound and vibration comfort, for example correct function, passenger safety, esthetics, price, the specification supplied by the client, etc.

The sound and vibration comfort objectives must be achieved while complying with all these requirements. These requirements may be set out in the form of a specification for each equipment supplier: for example, for the equipment supplier who supplies the glazing, requirements will be the shape of the glazing, its composition (materials used, thicknesses), its color, the required optical qualities, etc.

The requirements are divided into two groups:

the requirements known as absolute requirements, that is to say those that must be satisfied to ensure certain functions that the assembler considers essential (such as safety, operation of the vehicle etc.). For example, in the case of a glazing unit, transparency may be an absolute requirement;

the requirements known as undefined, that is to say that they may evolve (continuously or discretely) in a certain range, without prejudice to the overall quality of the vehicle. For example, in the case of a glazing unit, the thickness of the glazing unit may be an undefined requirement, if the assembler considers that several thicknesses are acceptable (whether or not conditional upon lying within a certain range).

It is also necessary to establish input data (block 3) that are defined by the design team according to the desired objectives and the requirements.

The input data influence the generation, propagation and transmission of the vibration and sound fields inside the vehicle. It is therefore on these data that it is necessary to act to optimize the sound and vibration comfort.

The data may be very varied. They relate not only to particular parts of the vehicle that each concern the equipment supplier separately, but also relate to the whole of the vehicle in order to design a component in an optimal manner because strong mechanical and sound relationships exist between all the elements of the vehicle. For example, because the bonding of the bodywork changes the dynamic behavior of the glazing relative to its behavior when it is taken in isolation, it is not possible to optimize this glazing with respect to the comfort inside the vehicle without precisely knowing the dynamic behavior of the bodywork.

Also, input data must be considered in the totality of the vehicle, and it is necessary that certain equipment suppliers know data relating to another equipment supplier.

For example, input data may include:

information on the geometry and dimensions (length, width and thickness) of the vehicle and of its constituent elements (glazing units, seals, connecting parts, etc.);

information on the physical properties of the materials forming the systems, such as the rigidity modulus and shear modulus and the densities;

information on the vibration excitations, for example for noises of solidborne origin and vibration comfort, the spectra of the forces injected into the studied system (such as the forces generated by the drive train on the bodyshell of the vehicle or the forces generated by contact between the vehicle and the road);

information on the sound and aerodynamic excitations; for example for the external noises transmitted through the air, the sound power spectra radiated by the sources and their directivity diagrams, or for noises of aerodynamic origin, a description of the pressure field exciting the walls (particularly by supplying information on the energy spectral density and the spatial intercorrelations);

information on the excitations by impact, for example, for rain noise, a description of the forces injected on the walls in deterministic or stochastic form.

These data may correspond to plans in any format, particularly in the form of a schematic, industrial drawing on paper, or computer data files created and able to be read for example by a computer-aided design software program.

When one member of the design team does not want to give too much information to the whole design team, for example for reasons of confidentiality of know-how or to prevent having to repeat work already done elsewhere, input data representing the behavior of a part, of an item of equipment or of some or all of the vehicle with respect to sound and vibration comfort may be more complex. The preparation of the data must be compatible with the design means used so that it is then possible to model the coupling of an item of equipment or a part with other systems without completely modeling these other systems. For example, the input data may be:

a modal base, complete or reduced, measured or computed, of a portion of the vehicle, a part or an item of equipment.

a set of transfer functions, spectra or interspectra, measured or computed, characterizing a portion of the vehicle, a part or an item of equipment.

loss factors by coupling and loss factors by damping, in the sense of the energy statistical analysis, characterizing a portion of the vehicle, a part or an item of equipment.

a condensed model or a super-element system (in the sense of finite elements) characterizing a portion of the vehicle, a part or an item of equipment.

Once the comfort indices are defined with their target value for each, and once the requirements and the input data are established for the vehicle, the values of the comfort indices are estimated for said vehicle (block 5) with the aid of the design means (block 4) that will be defined later, and these estimated values are compared with the target values (block 6).

If at least one of these values is different from the objective set, some or all of the input data are modified in isolation or in combination, while keeping unchanged the input data that are frozen by an absolute requirement, or by modifying the input data relating to undefined requirements, within the framework set for them, or by freely modifying the input data that are independent of any requirement.

The new input data set is reused for re-estimating the values of the comfort indices that are again compared with the target values in order to achieve them via an iterative method.

When, after a number of iterations judged sufficient depending on the complexity of the problem posed by the design team, no input data set has made it possible to achieve the objectives, the latter are redefined, the method is then amended by redefining the input data and where necessary the requirements.

When the objectives are achieved, a list of the input data having made it possible to achieve them (block 7) is established. The input data giving satisfaction make it possible to freeze the vehicle design from a sound and vibration point of view.

To perform the various operations of the optimization method, the design means used for designing a vehicle achieving the sound and vibration comfort objectives have first been defined. These means are defined jointly by the members of the design team according to the nature of the objectives to be achieved, the type of requirement and the technical means available (scientific and technical knowledge, measurement system, predictive computing system, etc.). These means make it possible, based on a certain number of input data, to obtain, directly or not, an estimate of magnitudes correlated with the comfort indices and to compare the values obtained with the objectives that have been defined.

The design means may be based on one or more experimental approaches, for example:

actual measurements on a part, an item of equipment or a complete vehicle, making it possible to ascertain a level of sound pressure, a level of vibration movement, speed or acceleration, the value of a psychoacoustic index, the force injected by one part on another, the power radiated by a part or an item of equipment, the sound absorption provided by a part or an item of equipment, the vibration damping provided by a part or an item of equipment, the sound insulation of a part or an item of equipment, the vibration attenuation of a part or an equipment of equipment.

diagnostic measurements on a part, an item of equipment or a complete vehicle, making it possible to understand the generation, propagation or amplification of certain noises or vibrations.

The design means may also be based on one or more totally numerical predictive approaches, for example:

a finite element modeling and/or finite/infinite element modeling approach describing the mechanical and/or sound interactions between part or all of the vehicle and where necessary the fluid (air) contained in the passenger compartment or in the external environment of the vehicle;

a frontier element modeling approach describing the mechanical and/or sound interactions between part or all of the vehicle and where necessary the fluid contained in the passenger compartment or in the external environment of the vehicle;

a ray shooting modeling approach describing the sound propagations inside the passenger compartment or in the external environment of the vehicle;

an energy modeling approach, which may or may not involve a statistical process, characterizing the interchanges and dissipations of vibration and/or sound energies between various elements of the vehicle and, where necessary, the fluid contained in the passenger compartment or in the external environment of the vehicle.

The design means may also be based on a mixed approach combining predictive and experimental approaches.

Therefore, the method for optimizing the sound and vibration performance inside a vehicle according to the invention considers a set of criteria defining the quality of the sound and vibration performance, in considering the requirements, in taking account of all the essential characteristics constituting the vehicle, and in modulating, programming, modifying these characteristics in combination.

The invention claimed is:

1. A method for optimizing sound and vibration performance inside a mobile passenger compartment, comprising:

establishing a list of comfort indices that are criteria defining quality of the sound and vibration performance and providing target values of the indices;

establishing a list of requirements concerning some or all of the whole passenger compartment and relating to plural equipment suppliers, the requirements being information relating to exigencies other than those concerning sound or vibration comfort;

defining input data influencing generation, propagation, and transmission of vibration and sound fields inside the passenger compartment, the input data being associated with plural equipment suppliers and certain input data being limited by requirements;

estimating values of the passenger compartment comfort indices according to the input data;

comparing the estimated values with the target values;

when the estimated values do not match the target values, acting individually or in combination on some or all of the input data; and repeating in an iterative manner the estimating the vehicle comfort index values, comparing them with the target values, and acting on the input data, so as to ensure convergence of the values of the comfort indices with the target values.

2. The method as claimed in claim 1, wherein the criteria defining the quality of the sound and vibration performance include measurable physical indices relating to the mobile passenger compartment in its entirety or to a part or an item of equipment of the passenger compartment.

3. The method as claimed in claim 2, wherein the physical indices include level of sound pressure at certain points of the passenger compartment, level of vibration movement, speed or acceleration at certain points of the passenger compartment, psychoacoustic or intelligibility index at certain points of the passenger compartment, level of sound power radiated by a part or an item of equipment, level of force injected by a part or an item of equipment, coefficient of sound absorption of certain parts or items of equipment, sound insulation of certain parts or items of equipment, coefficient of vibration damping provided by certain parts or items of equipment, and vibration attenuation provided by a fastening system between two parts or items of equipment.

4. The method as claimed in claim 1, wherein a user establishes a list of absolute requirements that must be satisfied to ensure certain functions that are considered essential and upon which it is imperative not to act, and a list of undefined requirements associated with their range of evolution, indicating characteristics whose values may change without prejudice to overall quality of the vehicle by defining proportions or ranges for which these values can be varied.

5. The method as claimed in claim 1, wherein the input data comprises geometry and/or dimensions of a vehicle and constituent elements of the vehicle, physical property values of materials and behavioral states of the constituent elements of the vehicle with respect to sound and vibration excitations in a form of values, modal bases, transfer functions, spectra, or interspectra.

6. The method as claimed in claim 1, further comprising design means for estimating magnitudes designed to be correlated with the target values of the criteria defining the quality of the sound and vibration performance, and to compare these magnitudes with the target values.

7. The method as claimed in claim 6, wherein the design means are defined before any operation for estimating the comfort values.

8. The method as claimed in claim 6, wherein the design means are based on experimental and/or totally numerical predictive approaches.

9. The method as claimed in claim 1, wherein the input data are modified while keeping unchanged the input data that are frozen by an absolute requirement, or by modifying the input data relating to undefined requirements, within a framework set for them, or by freely modifying the input data that are independent of any requirement.

10. The method as claimed in claim 1, wherein, when, after executing a number of iterations judged sufficient depending on complexity of the optimizing, no input data set has made it possible to achieve the objectives, the objectives are redefined by redefining the input data and where necessary the requirements.

11. The method as claimed in claim 1, wherein, when the optimization method is finished, a list of input data having made it possible to achieve the optimization is established.

12. The method as claimed in claim 1, wherein a shape of a radiation mode of a glazing unit, when the glazing unit is excited by a sound or vibration field, is modified in a spatial manner.

13. The method as claimed in claim 12, wherein at least the radiation mode or modes that are coupled with one or more cavity modes of the passenger compartment are removed for the glazing unit.

14. The method as claimed in claim 12, wherein a radiation mode of the glazing unit is offset frequentially relative to a cavity mode of the passenger compartment.

15. The method as claimed in claim 1, wherein sound phenomena are generated in phase opposition relative to radiations in the passenger compartment.

16. The method as claimed in claim 1, wherein action is taken on the nature of a material of an associated peripheral seal between the glazing unit and the passenger compartment.

17. The method as claimed in claim 1, wherein a mechanical coupling between the glazing unit and the passenger compartment is modified.

18. The method as claimed in claim 1, applied by an assembler to carry out overall design of a passenger compartment and/or by at least one equipment supplier to carry out design of a portion of the passenger compartment.

19. The method as claimed in claim 1, applied to a passenger compartment for a vehicle, a motor vehicle, truck, coach, agricultural machine, or train.

20. The method as claimed in claim 1, applied to a passenger compartment for an aircraft, boat, or submarine.

* * * * *